United States Patent Office 2,758,961
Patented Aug. 14, 1956

2,758,961

ELECTROFORMED IRON ARTICLES

Leo K. Kosowsky, Bridgeport, Conn., assignor to Columbia Records Inc., Bridgeport, Conn., a corporation of Delaware No Drawing. Application December 12, 1951,
Serial No. 261,392

1 Claim. (Cl. 204—5)

This invention relates to negative matrices for the production of phonograph records and has for its object the provision of an improved negative matrix for forming the records, and an improved method of producing the matrix.

The negative matrices, sometimes called "record-pressing matrices" or "stampers," of conventional construction which have been made for many years, comprise a thin layer of nickel electrolytically deposited (plated) directly over a positive matrix, usually called a "mother," and a layer of copper of considerable thickness deposited electrolytically over the nickel. The layer of nickel forming the negative face and having the negative sound grooves is employed because of its hardness and resistance to deformation. A further improvement commonly resorted to is the application of a very thin plating of chromium over the nickel, usually after the negative matrix has been stripped from the mother, to improve the strength and durability of the sound grooves.

The current practice in the production of the phonograph records involves placing the copper negative matrix in the record-molding machine and securing its peripheral edge by a clamping ring. The clamping ring bites into the soft copper, severely marring the edge so that the plastic material of the record adheres to this roughened edge and causes chipping of the records. The matrix must be uniformly flat in order to be properly supported on the mold base and to produce a uniformly flat record. It is accordingly necessary that the uneven and rough back of the matrix as initially produced be ground or machined to a relatively flat surface. Electroformed copper is very soft and when once deformed, as by bending or denting, it cannot be flattened or straightened without injuring the sound grooves. In removing the record from the face of the negative matrix, the unsupported central part of the matrix tends to be lifted and sprung out of shape. The grinding of the uneven back and the rigidity required in the matrix necessitate the building up of a relatively thick sheet of copper in a time-consuming operation. In the production of matrices for the present record-forming operations, the copper is built up to the thickness required to provide the necessary physical strength and uniformity, which is from 0.030 to 0.040 inch.

The copper matrices being relatively soft are subject to deformation under the conditions of modern record production, such as in the extrusion of thermoplastic resins. The extrusion of resins, such as polystyrene, polyethylene, and vinylite, under high pressure (around 2000 p. s. i. at around 500° F.) has imposed additional burdens and problems on the record manufacturer. The production of long-playing records with their delicate micro-grooved playing surfaces has emphasized the many problems of long standing associated with the production of records from negative matrices formed preponderantly of copper.

I have confirmed my conception that electroformed iron negative matrices have the properties of overcoming the aforementioned problems which have plagued the record manufacturers for many years and which have been accentuated in the production of long-playing records. My invention, accordingly, provides negative matrices (stampers) formed largely of electroformed iron, and a method of producing the matrices. The electroformed iron matrices present many advantages over the copper matrices. Iron matrices of, say, 0.015 inch thickness are stronger then the copper matrices of about twice this thickness, they may be produced in a much shorter time, they are more readily fashioned to a uniformly flat back surface, and because of their relatively high tensile strength and hardness, they are less easily deformed in removal from the mother and in the record-forming operation. When bent or bulged in amounts destructive to copper, they spring back into shape. My invention overcomes the dependence on scarce and costly copper, reduces the time of electroforming, and produces uniformly superior records in a much shorter time—all of which are reflected in a reduction in record cost. A singularly significant feature of the iron matrices of my invention is their magnetic property and their ability to be held by magnetic means in the record-forming mold without the use of deforming clamping rings.

In its more complete and presently preferred embodiment, my negative matrices comprise a thin layer of a hard metal like nickel deposited directly as a plating on the positive face of the mother, the iron being deposited over the nickel. In another embodiment of my invention, I may deposit a plating of copper over the nickel plating on the mother and then deposit the layer of iron over the copper. It is advantageous, and it is my present preferred practice, to apply a thin plating of chromium over the nickel and the finished back of the iron matrix to improve the wear characteristics of the sound grooves and to protect the iron from corrosion.

In accordance with the method of my invention, I may use any suitable positive matrix or mother having any kind of grooving, either for short or long-playing records and preliminarily coated with any hard metal such as nickel, and apply over the hard metal a layer of electroformed iron. In producing the improved iron matrices of my invention, I may apply a plating of hard metal on the positive face of the mother, and then apply a layer of iron over the hard metal in any suitable electroforming operation. I prefer, however, to carry out the following advantageous sequence of operations:

The mother, produced by any of the well known practices, is mounted on a cathode holder and treated for the nickel plating. This may be done by carefully washing the face of the mother with a sodium cyanide solution while brushing with a soft brush until it supports a continuous film of water. The final water rinse should be brushed off with a fine brush, such as a nylon brush having bristles whose diameter is less than 0.030 inch.

The cleaned and brushed mother is then treated with a parting agent. I prefer to dip the clean wet mother in a potassium bichromate parting solution, immediately rinse it front and back, and immerse it in a standard nickel plating solution for, say, 180 ampere minutes. When the nickel layer so deposited is about 0.001 inch thick, the mother is removed from the solution and rinsed with water. At this stage, I may follow either of two courses: (1) I may proceed directly to the iron electroforming operation, or (2) I may apply a plating of copper over the nickel. In preparation for plating with copper, the mother is pickled in 10 Baumé sulfuric acid pickle, and then immersed in a standard acid copper solution to apply a plating of copper over the nickel of from 0.001 to 0.003 inch thickness. However, this copper plating can be omitted for iron matrices with a saving in time and at a reduction in cost.

The mother with its facing of nickel, with or without a plating of copper, is advantageously given a preliminary treatment before starting the actual iron plating by immersing it in a warm (around 170° F.) very dilute hydrochloric acid pickle in which it remains for about 1 minute so that it assumes the temperature of the pickle. The mother is then immersed in a hot iron plating solution of any satisfactory character and preferably held without current contact until it has assumed the temperature of the solution. These preliminary treatments aid in the deposition of a better and more adhering initial plating of iron over the nickel or copper, as the case may be. The mother is then connected to the power line and the current is held at a low current density of, say, about 10 amperes per square foot for about 1 hour. The mother is a rather frail structure and the anode connection is clamped at the center. If the mother were reciprocated in the usual manner at this stage, a certain amount of flexing would occur and this would loosen the nickel. I have found that the mother should be held motionless for a sufficient time, usually about 1 hour, to allow the iron to deposit to such thickness that the mother can be oscillated in the electrolytic solution without flexing. The mother is then oscillated and the current density is increased to a much higher value, say, about 60 amperes per square foot, and the electroforming is continued until a layer of iron of from 0.015 to 0.020 inch has been deposited. The surface of the mold for compression molding machines is usually crowned a few thousandths of an inch and it is possible to deposit a layer of iron which is about 0.008 inch at the center and about 0.020 inch at the periphery. This can be done by using the snap ring as a baffle.

After the layer of electroformed iron has been deposited, the mother is removed from the electrolytic solution, rinsed in warm running water, and the snap ring is removed. The mother with its negative matrix attached may be treated to minimize oxidation of the iron and to this end it is immersed in an alkaline potassium bichromate solution containing, for example, ¼ pound of potassium bichromate, 3 pounds of sodium hydroxide, and 1 pound of trisodium phosphate in 40 gallons of water. The electrode holder is removed and the mother and its matrix are dried and then placed in a punching die which shears off the edge of the matrix to the diameter of the record to be formed. At the exposed cut edge, the iron matrix is pried off the mother. The mother and matrix may be placed in a lathe and the cutter set to cut through the matrix. The mother and matrix are then immersed in water containing a wetting agent to remove small pieces of metal and the matrix is pried off while immersed. Since the matrices are relatively flat and fairly uniform in thickness from center to periphery, the backs can be ground to satisfactory smoothness on a simple belt sander in but a few seconds. (One reason for the relative flatness is that the unevenness is not accentuated because much less iron is deposited than is the case with copper. Masking can be used to control unevenness.) The iron matrices are then preferably chromium plated, both front and back, simultaneously in a single plating operation requiring but a few seconds and according to present practices. It is advantageous to plate with chromium to obtain a better negative face and to protect the ground iron back surface and sheared edge from oxidation.

The iron is relatively hard as initially produced, and although it is self-annealing in a matter of days at room temperature, it is recommended that the matrix be annealed at about 550° F. for a few minutes to relieve hydrogen brittleness and to insure that the iron will be more ductile in all planes.

The electrolytic cell, the electrode holder and all parts thereof including pipes, pumps, etc. (all elements which contact the electrolyte) are preferably lined with sulfur-free rubber, polyethylene, Carbate, or Duramet which is bonded to the metal with a sulfur-free adhesive material. Means are provided for the circulation of the electrolyte, such as centrifugal pumps, and the maintenance of a uniform temperature, such as Vitrocile electric immersion heaters, as well as Carbate heat exchangers.

As a precaution to minimize the pickup of impurities, for about two weeks previous to putting the electrolytic solution into the electrolytic cell dilute hydrochloric acid at a temperature of around 200° F. should be circulated through the entire system to make certain that all impurities are leached out of the lining of the tank, pipes, pumps, and heat exchangers so that the entire apparatus becomes chemically pure for the purposes intended.

To prepare the electrolytic solution, weighed quantities of ferrous chloride and calcium chloride (preferably technical grades) are dissolved in hot water in special tanks (not in the cell) to produce a saturated solution. When some of the salts remain on the bottom, the solution has been saturated. The object in preparing a saturated solution is to facilitate the precipitation of impurities and to keep the volume as small as possible.

The solution in these tanks is allowed to stand and when it arrives at room temperature the top of the solution is skimmed off. This removes the calcium sulfate formed from the ferrous sulfate which is an impurity of the ferrous chloride. The top liquor is then siphoned from the tanks into still another tank and hydrochloric acid is added to bring the pH down to approximately zero electrometrically. This solution is again allowed to stand for several days, giving the hydrochloric acid a chance to reduce as much of the iron chloride as possible. The solution by this time should take on a deep green appearance. Periodic checks should be made on the pH during this standing operation and acid added, if necessary, to keep the pH below 1.5.

The solution is then filtered through a mechanical filter using paper or cloth filters which are impregnated with fresh sulfur-free activated carbon. A double filtration is advisable; that is, the solution is filtered through one filter, pumped into a tank, and from this tank pumped into the electrolytic cell.

The iron anodes that are to be used should be of pure, soft low-carbon iron. They must be degreased, if necessary, as by washing with benzene and thoroughly pickled in concentrated hydrochloric acid for around 24 hours before they are to be used. During the operation, the iron anodes are surrounded by, or suspended in, suitable acid resistant diaphragms. I prefer to use diaphragms made of Dynel cloth or African blue asbestos in the form of bags in which the anodes are suspended. The bags are preferably much larger than the anodes and arranged to catch and hold solid impurities which are derived from the anodes. These diaphragms must also be washed for several days in concentrated hydrochloric acid to remove impurities before they are used. When the electrolyte is initially prepared as a saturated solution, it is necessary to add water to bring the concentration down to about 64 ounces to the gallon of ferrous chloride.

In preparing the electrolyte for the initial operation, I carry out a preplating operation with dummy cathodes for several days, if necessary, to reduce the solution to the ferrous state and to remove on the cathodes any copper or lead that may be in the solution. The pH of the solution must be carefully watched as it has a tendency to rise and must at no time go above 1.5 electrometrically; otherwise the solution will begin to oxidize.

In order to minimize the absorption of oxygen by the electrolyte and to reduce evaporation and the escape of fumes, I cover the surface with a floating layer of flakes of inert material, such as flakes of polyethylene. This flake material should also be purified by washing and immersing in dilute hydrochloric acid. This is accomplished by putting the material in clean, washed muslin bags and immersing them in dilute hydrochloric acid for several days.

When the apparatus and electrolyte are in proper condition for operation, the mother on the anode holder and with the ring attached is first immersed in a hydrochloric acid pickle for about 1 minute at around, say, 170° F., and is then immersed, without agitation, in the electrolyte which is at the operating temperature of around 200° F. to equalize the temperature. Then about 10 amperes per square foot are applied for about 1 hour while the mother is motionless. When enough iron has been built up to make the mother-cathode sufficiently stiff, the current is increased to 60 amperes per square foot and the oscillatory motion is started.

During operation, the electrolyte is maintained under reducing conditions at a uniform temperature and the operating pH is carefully maintained at a uniform selected value in the range of 0.4 to 1.2, say,, pH 1. In order to maintain this uniformity, additions of hydrochloric acid are made from time to time.

The temperature of the electrolyte can be maintained at any selected temperature, preferably from 185° F. to 205° F. It is important, however, to maintain the selected temperature, say, 200° F. within a variation of 1° F. Periodically the electrolyte is circulated to effect mixing, but when the temperature has equalized, the electrolyte is left at rest as a precaution to minimize the introduction of oxygen by the pumping equipment. Usually it is circulated for ½ hour every 5 hours to keep the solution uniform. As a precaution during operation, the periodic removal of accumlated copper and lead is made by introducing a special cathode in the form of a corrugated iron sheet into the electrolyte and operating the cell at about 1 volt and a current density of about 5 amperes per square foot which are favorable for the deposition of these metals.

The plating time is calculated on the basis of 225 amperes hours for 7 inch or 10 inch records; 250 ampere hours for 12 inch records; and 350 ampere hours for 16 inch records. The electrodeposition of iron results in a layer about 0.0005 inch at the low current density and a layer of from 0.015 to 0.018 inch at the high current density. It is usually not necessary to deposit a layer of iron exceeding 0.020 inch because of the rigidity, strength and uniformity of the electroformed iron.

The iron matrices which are produced according to my preferred electroforming method have unusual physical properties, the tensile strength varying from 60,000 to 72,000 p. s. i. and the elongation varying from 9% to 12%. There is an intimate firm and permanent bonding of the iron to the nickel. The iron has relatively high tensile strength and low ductility and is quite springy, having the property of returning to its original shape on being flexed, as when bent during stripping or other handling, or when dented as when a small hard object gets between the matrix and the mold.

The iron matrices of the invention have many advantages over the conventional copper matrices. Because the iron is more rigid than copper, it is easier to strip the matrix from its mother and the waves which commonly result from stripping copper matrices from their mothers are eliminated. These waves frequently caused swishes and apparent stretch in records. Stretch in a matrix causes deterioration of the quality of the music, commonly called "Wows," which is apparent in music having long sustaining notes. Because iron does not stretch and deform like copper, because little imperfections or deposits on the back of the mold will not press through, and because of elimination of ring cut, the iron matrices' life are about three times as great as that of copper matrices.

The saving in electroforming time and in the record-pressing cycle is appreciable. It requires from 4 to 5 hours to form the iron matrix as against 24 hours to form a copper matrix. Because of greater mechanical strength, the iron matrix can be from 0.015 to 0.020 inch thick, whereas the copper must be from 0.030 to 0.040 inch thick. The record-pressing cycle has been cut about 15% by the use of thin iron matrices due to a reduction in the time of heating and cooling.

It is necessary in making the thick copper matrices to turn the backs to evenness on a vacuum chuck lathe. The iron matrices are much smoother than copper, and since they are much thinner, there is less unevenness from center to periphery, the machining can be eliminated, and the backs of the iron matrices made smooth on a simple belt sander.

Iron is a readily available and inexpensive metal and, for these reasons, has definite advantages over the frequently restricted and expensive copper. Of course, the iron matrices are magnetic and this introduces far reaching advantages in the record-forming operations, since such matrices may be held by permanent magnets or electromagnets during the record stamping operation.

I claim:

The method of producing negative matrices consisting preponderantly of iron which comprises immersing a cathodic mother in an aqueous electrolyte of ferrous chloride and calcium chloride and under reducing conditions at a pH of less than 1.5 and at a uniform temperature, maintaining the mother stationary at a relatively low current density about 10 emperes per square foot until a layer of iron about .0005 inch thick has been deposited, and then effecting a back and forth movement of the mother and increasing the current density to deposit the major part of the iron.

References Cited in the file of this patent
UNITED STATES PATENTS

| | | |
|---|---|---|
| 1,513,120 | Madsen | Oct. 28, 1924 |
| 1,746,751 | Van Derhoef | Feb. 11, 1930 |
| 2,316,917 | Wallace et al. | Apr. 30, 1943 |
| 2,327,762 | Bull | Aug. 24, 1943 |
| 2,465,276 | Ryder | Mar. 22, 1949 |

OTHER REFERENCES

Modern Electroplating, special vol. of the Electrochemical Society, 1942, pp. 215–217.

Metal Industry, Aug. 14, 1936, pp. 165–168 and Sept. 11, 1936, pp. 239–242, 265 and 267.

Transactions Electrochemical Society, vol. 57, 1930, pp. 59–71 and 72–77.